(12) United States Patent
Fukutani et al.

(10) Patent No.: US 8,395,347 B2
(45) Date of Patent: Mar. 12, 2013

(54) INDUCTION MOTOR CONTROL DEVICE AND INDUCTION MOTOR GROUP CONTROL SYSTEM

(75) Inventors: Kazuhiko Fukutani, Tokyo (JP); Hideo Narisawa, Tokyo (JP); Ryuichi Shimada, Tokyo (JP); Takanori Isobe, Tokyo (JP); Tadayuki Kitahara, Tokyo (JP)

(73) Assignee: Ryuichi Shimada, Tokyo (JP)

( * ) Notice: Subject to any disclaimer, the term of this patent is extended or adjusted under 35 U.S.C. 154(b) by 0 days.

(21) Appl. No.: 13/138,762

(22) PCT Filed: Mar. 10, 2010

(86) PCT No.: PCT/JP2010/053983
§ 371 (c)(1),
(2), (4) Date: Sep. 22, 2011

(87) PCT Pub. No.: WO2010/116840
PCT Pub. Date: Oct. 14, 2010

(65) Prior Publication Data
US 2012/0019188 A1    Jan. 26, 2012

(30) Foreign Application Priority Data
Mar. 30, 2009 (JP) .................. 2009-083124

(51) Int. Cl.
*H02P 25/00* (2006.01)
*H02P 5/00* (2006.01)
(52) U.S. Cl. ............ 318/729; 307/11; 307/42; 307/406; 307/412; 307/413; 323/242; 323/244; 323/271; 323/281; 323/326; 363/10; 363/17; 363/19; 363/23; 363/25

(58) Field of Classification Search ............ 307/11, 307/42, 406, 412, 413, 414, 415, 416, 419; 318/610, 609, 621, 650, 654, 660, 727–732; 323/242–244, 271–277, 281, 326
See application file for complete search history.

(56) References Cited

U.S. PATENT DOCUMENTS
6,720,753 B2 * 4/2004 Kikuchi et al. ................ 322/17
(Continued)

FOREIGN PATENT DOCUMENTS
JP    8-66032    3/1996
JP    2000-358359    12/2000
(Continued)

OTHER PUBLICATIONS

Isobe, T.; Wiik, J.A.; Wijaya, F.D.; Inoue, K.; Usuki, K.; Kitahara, T.; Shimada, R.; , "Improved Performance of Induction Motor Using Magnetic Energy Recovery Switch," Power Conversion Conference—Nagoya, 2007. PCC '07, vol., no., pp. 919-924, Apr. 2-5, 2007 doi: 10.1109/PCCON.2007.373076.*

(Continued)

*Primary Examiner* — Walter Benson
*Assistant Examiner* — Said Bouziane
(74) *Attorney, Agent, or Firm* — Kenyon & Kenyon LLP

(57) ABSTRACT

In an induction motor group control system, magnetic energy recovery switches (3) are connected in series to an induction motor (2) directly driven by a commercial power supply, and a plurality of induction motor control devices (10) enabling voltage control and reactive power control of the induction motor 2 are employed to control generation of reactive power so as to maximize a power factor of the entire plurality of AC loads including the induction motor or compensate variations in voltage of an AC power supply (1).

4 Claims, 10 Drawing Sheets

U.S. PATENT DOCUMENTS

2006/0152955 A1 7/2006 Shimada
2007/0159279 A1* 7/2007 Shimada et al. ............... 335/40

FOREIGN PATENT DOCUMENTS

| | | |
|---|---|---|
| JP | 2003-244981 | 8/2003 |
| JP | 2004-260991 | 9/2004 |
| JP | 2005-57980 | 3/2005 |
| JP | 2007-58676 | 3/2007 |
| WO | WO 2008/032855 | 3/2008 |

OTHER PUBLICATIONS

Wiik, J.A.; Kulka, A.; Isobe, T.; Usuki, K.; Molinas, M.; Takaku, T.; Undeland, T.; Shimada, R.; , "Loss and Rating Considerations of a Wind Energy Conversion System with Reactive Compensation by Magnetic Energy Recovery Switch (MERS)," Wind Power to the Grid—EPE Wind Energy Chapter 1st Seminar, 2008. EPE-WECS 2008 , vol., no., pp. 1-6, 27-28 Marc.*
International Preliminary Report on Patentability dated Nov. 24, 2011, issued in corresponding PCT Application No. PCT/JP2010/053983.
English translation of the Written Opinion of the International Searching Authority, dated Jun. 8, 2010, issued in corresponding PCT Application No. PCT/JP2010/053983.
International Search Report dated Jun. 8, 2010 issued in corresponding PCT Application No. PCT/JP2010/053983.

* cited by examiner

INDUCTION MOTOR CONTROL DEVICE AND INDUCTION MOTOR GROUP CONTROL SYSTEM

This application is a national stage application of International Application No. PCT/JP2010/053983, filed Mar. 10, 2010, which claims priority to Japanese Application No. 2009-083124 filed Mar. 30, 2009, which is incorporated by reference in its entirety.

TECHNICAL FIELD

The present invention relates to an induction motor control device and an induction motor group control system, and particularly to a technique suitable for achieving a reduction in reactive power and voltage stabilization in an electric power system having a load including an induction motor therein.

BACKGROUND ART

An induction motor among motors is driven relatively easily during operation from its start-up, and further can be used by just being directly connected to a commercial power supply, so that it has been widely employed for various uses.

With recent development of power electronics, it is possible to drive the induction motor at variable speed. That is, alternating-current power is once converted into direct-current power, and by an inverter that inversely converts the direct-current power into alternating-current power different in frequency by switching a semiconductor switch with high frequency, the induction motor is driven. However, a fan motor, a compressor, a motor of a pump, or the like drives an object at a constant rotational speed, and thereby purposes of their usage are sufficiently satisfied in many cases. In a factory or the like in particular, the proportion of a motor directly driven by a power supply frequency of 50 Hz, 60 Hz, or the like is large by reason of the increased number of installed motors • the size of capacity, and the like and due to problems of cost • installation space of the inverter, and the like.

On the other hand, as for reactive power, such as the induction motor, there are a lot of electrical apparatuses taking current with a lagging power factor, and when the power factor is low, current supplied to a load is increased. Thus, capacity and loss of "a transmission distribution installation such as a transformer" existing in a distribution line or a distribution system are increased. Further, in a transmission distribution system in general, system reactance at a customer side is inductive due to reactance existing in a wiring, leakage reactance of a transformer, or the like. Thus, voltage at a receiving end of a customer reduces by current with a lagging power factor.

For a problem caused by the existence of such a load with a lagging power factor, compensation by a device to generate reactive power has been performed.

As the easiest method for performing such compensation, there is a method of connecting a phase advancing capacitor in parallel to a power supply. The above method is to apply power to an electric power system in stages by using a switch so as to make capacitance of the capacitor become an appropriate value to thereby generate reactive power corresponding to a load. Further, as one with large capacity to be connected to an electric power system, there is a synchronous phase modifier. The synchronous phase modifier controls a generation amount of reactive power in a manner that a synchronous machine being a rotary machine is connected to the electric power system to control a field current of the synchronous machine. In recent years, in an electric power system or for a very variable load, there has been used a static-type reactive power compensation device to which a semiconductor power conversion technique is applied in order to stabilize voltage, or the like (a TSC, a TCR, an SVG, an STATCOM, and so on have been known).

A magnetic energy recovery bidirectional current switch disclosed in Patent Document 1 and the like, (which is described as "a magnetic energy recovery switch" here), is a switch circuit configured with a bridge circuit composed of four reverse conductive semiconductor switches and a capacitor connected between direct-current terminals of the above bridge circuit. As a technique to improve a power factor of a load by using such a magnetic energy recovery switch, there is a technique described in Patent Document 2. In the technique described in Patent Document 2, the magnetic energy recovery switch is connected in series between an AC power supply and an AC load to be switched according to a cycle of the AC power supply, and thereby the magnetic energy recovery switch operates as a series capacitor to improve a power factor. Further, Patent Document 3 discloses that such a circuit is applied to a rotary machine such as an electric motor or a power generator to thereby improve a power factor of the rotary machine in which an inductance such as a leakage inductance exists.

Applying the magnetic energy recovery switch to an AC load with a lagging power factor makes it possible to generate reactive power to a power supply, and by the above reactive power, reactive power necessary for the load with the lagging power factor can be compensated. Patent Document 4 discloses that the above fact is employed, and the magnetic energy recovery switch is applied to one of two AC loads with a lagging power factor to make the entire power factor become one, and thereby the power factor is improved.

The induction motor directly driven by a commercial power supply is simple but has problems on its efficiency at the time of operation, excessive starting current, and the like because it is not electrically controlled.

On the other hand, as for the compensation of reactive power, compensation of reactive power at a receiving point of an electric power system or a customer installation has been performed widely. However, in a large-scale customer, a path from a receiving point to an actual load is long in many cases. Thus, flowing of current with a low power factor is disadvantageous in terms of loss of a distribution line or capacity of an installation. It is necessary to install a reactive power compensation device in the vicinity of a load in order to perform compensation of reactive power in the vicinity of the end of the distribution line.

Here, the previously described static type reactive power compensation by a semiconductor converter widely used currently will be described. The TSC is to switch a capacitor by a thyristor switch. Thus, it is not possible for the TSC to continuously control reactive power at a high speed. The TCR is the combination of a fixed capacitor and a reactor controlled by a thyristor. Thus, the TCR has a problem that not only the capacitor but also the reactor is needed. The SVG switches a reverse blocking type semiconductor switch at a high speed in order to perform PWM and the like. Thus, the SVG has a problem that switching loss increases. Accordingly, it is not common to employ these conventional reactive power compensation devices for compensation of reactive power in the vicinity of the end of a distribution system.

CITATION LIST

Patent Literature

Patent Document 1: Japanese Laid-open Patent Publication No. 2000-358359
Patent Document 2: Japanese Laid-open Patent Publication No. 2004-260991
Patent Document 3: Japanese Laid-open Patent Publication No. 2005-57980
Patent Document 4: Japanese Laid-open Patent Publication No. 2007-58676
Patent Document 5: International Publication Pamphlet No. 2008/32855
Patent Document 6: the specification of U.S. Patent Application Publication No. 2006/152955.

SUMMARY OF THE INVENTION

Technical Problem

An object of the present invention is to achieve a reduction in reactive power and voltage stabilization in the vicinity of the end of a distribution system by controlling one or a large number of induction motors connected to the end of the distribution system when the induction motor/induction motors is/are connected to an electric power system being an AC power supply to be driven.

Solution to Problem

As a result of dedicated studies on driving of an induction motor and the like, the present inventor has reached an idea that magnetic energy recovery switches are connected to a large number of induction motors connected to the end of a distribution line to enable control of terminal voltages of the induction motors, and by employing a large number of the magnetic energy recovery switches, compensation of reactive power in the vicinity of the end of a distribution system is allowed to be performed, and has completed the present invention. In order to solve the above-described problems, according to an aspect of the present invention, there is provided an induction motor control device being an induction motor control device controlling an induction motor to operate based on power supplied from a three-phase AC power supply, the induction motor control device including: three magnetic energy recovery switches that are connected in series in respective phases between the AC power supply and the induction motor and each have four self distinguishing elements; a first voltage detection unit provided between the magnetic energy recovery switches and the induction motor and measuring a terminal voltage of each of the phases applied to the induction motor; a second voltage detection unit provided between the AC power supply and the magnetic energy recovery switches and measuring voltages of the AC power supply; a current detection unit measuring currents to be supplied to the induction motor; and a gate control unit generating a gate signal that controls on • off of each of the self distinguishing elements included in each of the magnetic energy recovery switches of the respective phases, in which based on measured values of the terminal voltages input from the first voltage detection unit, measured values of the currents input from the current detection unit, and measured values of the voltages of the AC power supply input from the second voltage detection unit, the gate control unit sets a switching phase of the gate signal so as to control a generation amount of reactive power, and controls voltages to be applied to the induction motor.

Further, the gate control unit may also include: an inter-terminal voltage arithmetic operation section arithmetically operating a terminal voltage measured value being an instantaneous voltage effective value continuously based on the measured values of the terminal voltages input from the first voltage detection unit; a reactive power control section calculating a measured value of the reactive power based on the measured values of the voltages of the AC power supply input from the second voltage detection unit and the measured values of the currents input from the current detection unit, and outputting a command value of the terminal voltages such that the measured value of the reactive power becomes a command value; a control section performing P control or PI control based on a deviation between the terminal voltage measured value arithmetically operated in the inter-terminal voltage arithmetic operation section and the command value of the terminal voltages output from the reactive power control section, and generating a switching phase amount of the gate signal; and a phase control section generating a gate signal shifted by the switching phase amount generated in the control section on the basis of the measured values of the voltages of the AC power supply input from the second voltage detection unit, and outputting the gate signal to each of the magnetic energy recovery switches of the respective phases.

Further, in order to solve the above-described problems, according to another aspect of the present invention, there is provided an induction motor group control system being an induction motor group control system that uses a plurality of the induction motor control devices to control a plurality of induction motors to operate based on power supplied from a three-phase AC power supply, the induction motor group control system including: the plurality of induction motor control devices controlling the plurality of induction motors respectively; a measuring device measuring reactive power based on a combined current of currents flowing into the plurality of induction motor control devices and other loads that are connected to the AC power supply; and a group control device, based on the reactive power measured in the measuring device, generating a command value of reactive power to each of the plurality of induction motor control devices such that the reactive power becomes a predetermined value, and outputting the command value of the reactive power to each of the plurality of induction motor control devices to thereby control the amount of reactive powers generated by the plurality of induction motors, in which a power factor of the entire system composed of the plurality of loads including the plurality of induction motors driven by the AC power supply is controlled.

Further, in order to solve the above-described problems, according to another aspect of the present invention, there is provided an induction motor group control system being an induction motor group control system that uses a plurality of the induction motor control devices to control a plurality of induction motors to operate based on power supplied from a three-phase AC power supply, the induction motor group control system including: the plurality of induction motor control devices controlling the plurality of induction motors respectively; a measuring device measuring reactive power based on a combined current of currents flowing into the plurality of induction motor control devices and other loads that are connected to the AC power supply; a voltage measuring device measuring voltages of the AC power supply; and a group control device, based on the reactive power measured in the measuring device and the voltages measured in the voltage measuring device, generating a command value of reactive power to each of the plurality of induction motor control devices such that the reactive power becomes reactive power based on the voltages, and outputting the command value of the reactive power to each of the plurality of induction motor control devices to thereby control the amount of reactive powers generated by the plurality of induction motors and reduce variations in the voltages of the AC power supply.

DESCRIPTION OF EMBODIMENTS

Figure 1:
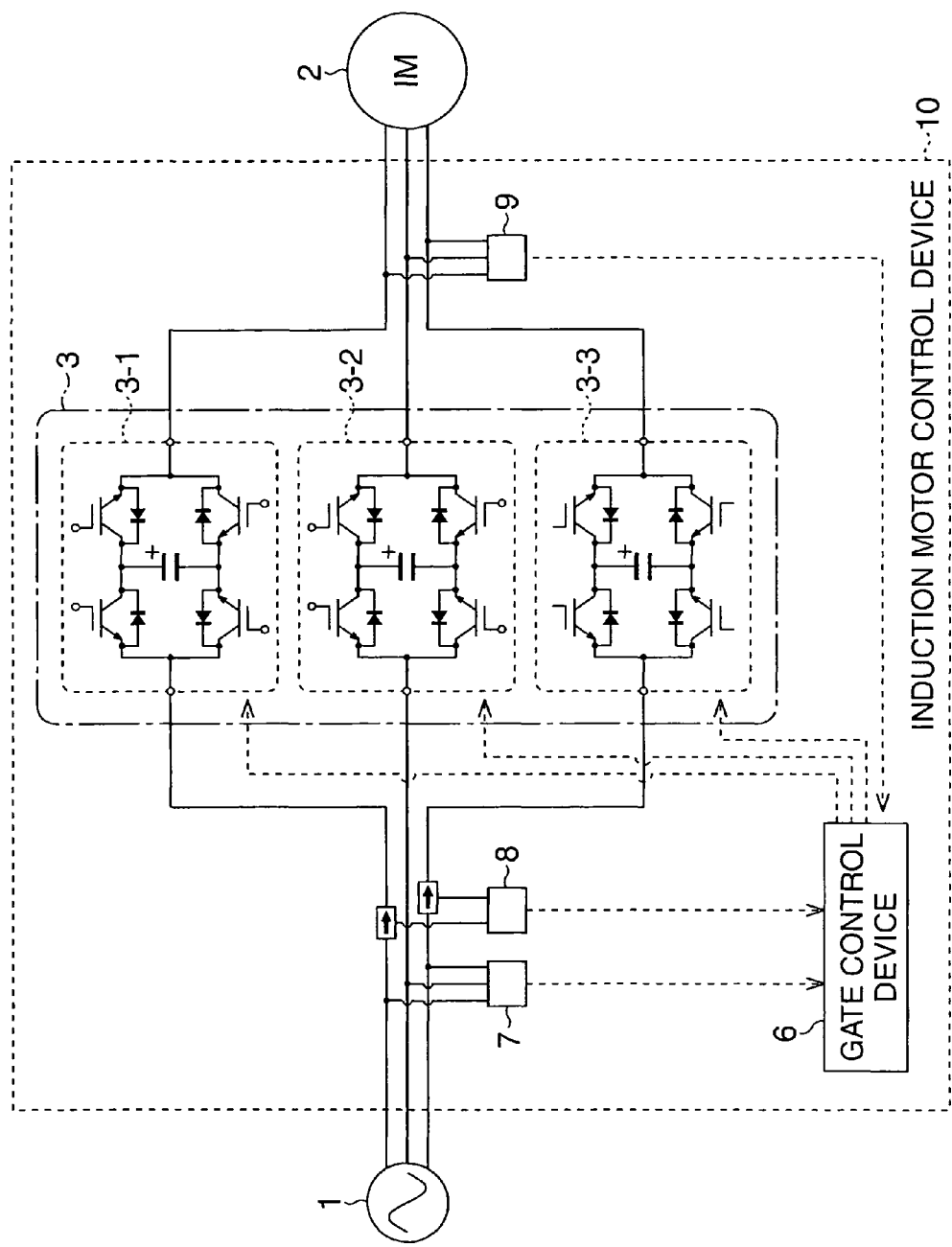
FIG. 1 is a block diagram showing a configuration example of an induction motor control device according to a first embodiment of the present invention.

Hereinafter, preferred embodiments of the present invention will be explained in detail with reference to the drawings. Note that in the present description and the drawings, components having practically the same function • configuration are denoted by the same reference numerals to thereby omit repeated explanation.

<1. Configuration Example and the Like of an Induction Motor Control Device According to a First Embodiment>

(1-1. The Whole Configuration)

FIG. 1 shows an outline of one example of a configuration of an induction motor control device according to a first embodiment of the present invention.

An induction motor control device 10 is configured to include: three magnetic energy recovery switches 3 (magnetic energy recovery switches 3-1 to 3-3); a gate control device 6; a voltage detection device 7; a current detection device 8; and a voltage detection device 9.

The magnetic energy recovery switches 3 are each referred to as a MERS (Magnetic Energy Recovery Switch). In this embodiment, a three-phase induction motor 2 is used as a load and a three-phase AC power supply 1 is used, so that the magnetic energy recovery switches 3 (magnetic energy recovery switches 3-1 to 3-3) are provided one by one for respective phases.

The configuration and operation of the magnetic energy recovery switches 3 are described not only in Patent Documents 1 to 4 but also in Patent Documents 5 and 6. By reference to the facts described in all the specifications and drawings of Patent Documents, the magnetic energy recovery switches 3 can be fabricated. Thus, an outline of the magnetic energy recovery switches 3 will be hereinafter explained.

Figure 2:
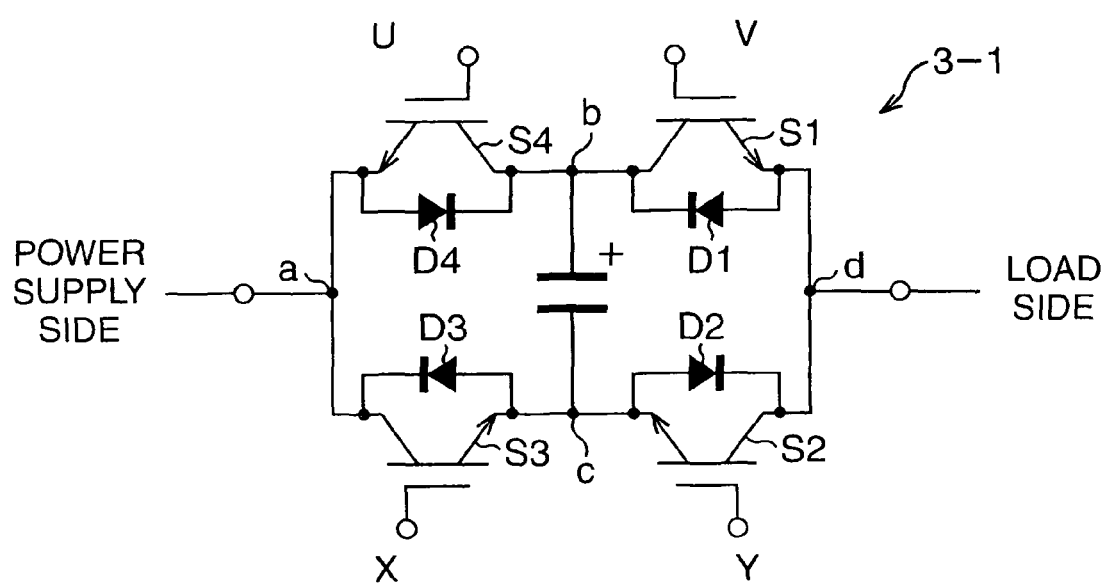
FIG. 2 is a view showing a configuration example of a magnetic energy recovery switch.

FIG. 2 is a view showing one example of a configuration of the magnetic energy recovery switch 3-1. Incidentally, configurations of the magnetic energy recovery switches 3-2, 3-3 are the same as that of the magnetic energy recovery switch 3-1, so that detailed explanation of the magnetic energy recovery switches 3-2, 3-3 is omitted here.

As shown in FIG. 2, the magnetic energy recovery switch 3-1 includes: a bridge circuit; and a capacitor C. The bridge circuit includes a first path being a path connecting an AC terminal a (that will be referred to as a terminal a, hereinafter) connected to the AC power supply 1 and an AC terminal d (that will be referred to as a terminal d, hereinafter) connected to the induction motor 2 via a terminal b. In the above first path, a reverse conductive type semiconductor switch V is disposed between the terminal d and the terminal b, and a reverse conductive type semiconductor switch U is disposed between the terminal b and the terminal a.

Further, the bridge circuit includes a second path being a path connecting the terminal a and the terminal d via a terminal c. In the above second path, a reverse conductive type semiconductor switch Y is disposed between the terminal d and the terminal c, and a reverse conductive type semiconductor switch X is disposed between the terminal c and the terminal a.

The capacitor C is disposed between the terminal b and the terminal c.

The respective reverse conductive type semiconductor switches V, Y, X, and U are switches to conduct in one direction determined by diodes D1 to D4, (which will be referred to as a forward direction, hereinafter), when semiconductor switches S1 to S4 are off, and to conduct also in the other direction when the semiconductor switches S1 to S4 are on. In the example shown in FIG. 2, the reverse conductive type semiconductor switches V, Y, X, and U each include one of the diodes D1 to D4 and one of the semiconductor switches S1 to S4 connected in parallel to the diodes D1 to D4. However, the reverse conductive type semiconductor switches V, Y, X, and U are not limited to the ones described previously as long as being configured to conduct as described previously. For example, power MOSFETs, reverse conductive type GTO thyristors, or the like may also be employed for the reverse conductive type semiconductor switches V, Y, X, and U. Further, the reverse conductive type semiconductor switches V, Y, X, and U may also be each configured to connect a semiconductor switch such as an IGBT and a diode in parallel.

Here, the reverse conductive type semiconductor switches V, X are disposed such that their forward directions become the same direction. Further, the reverse conductive type semiconductor switches Y, U are disposed such that their forward directions become the same direction. Then, the reverse conductive type semiconductor switches V, X and the reverse conductive type semiconductor switches Y, U are disposed such that the forward directions are opposite to each other.

The reverse conductive type semiconductor switches V, X (semiconductor switches S1, S3) perform on • off at the same timing. Further, the reverse conductive type semiconductor switches Y, U (semiconductor switches S2, S4) perform on • off at the same timing. Then, it is designed such that the reverse conductive type semiconductor switches Y, U (semiconductor switches S2, S4) are off (on) when the reverse conductive type semiconductor switches V, X (semiconductor switches S1, S3) are on (off).

The magnetic energy recovery switches 3 (magnetic energy recovery switches 3-1 to 3-3) as above are connected in series between the AC power supply 1 and the induction motor 2.

Returning to the explanation of FIG. 1, the gate control device 6 controls timings of on • off of respective self distinguishing elements (corresponding to the four reverse conductive type semiconductor switches V, Y, X, and U) in the magnetic energy recovery switches 3.

The voltage detection device 7 detects time waveforms of voltages of the three-phase AC power supply 1. The current detection device 8 detects time waveforms of currents of the three-phase AC power supply 1. The voltage detection device 9 measures time waveforms of terminal voltages of the induction motor 2.

Incidentally, in the following explanation, the frequency of the AC power supply 1 is set to 50 Hz, but it is obvious that the present invention can be similarly implemented also at a power supply frequency used in general or a special power supply frequency, besides the above.

(1-2. The Magnetic Energy Recovery Switch)

As a result of dedicated studies on magnetic energy recovery switches and so on described in Patent Documents 2, 3, and so on, the inventors of the present invention have found the following facts. That is, the respective self distinguishing elements in the magnetic energy recovery switches 3 are turned on • off (perform switching) one time in synchronization with the phase of the AC power supply 1 in one cycle of a power supply waveform of the AC power supply 1, and a difference in phase between the phases of the AC power supply 1 and the timings of switching of the respective self distinguishing elements in the magnetic energy recovery switches 3 (a switching phase) are controlled. In this manner, it is possible to control the magnitude of voltages and the phases of currents, which are supplied to the induction motor 2. Thus, the voltage detection device 7 is used to control the above switching phase.

Here, as described previously, the names of the four self distinguishing elements configuring each of the magnetic energy recovery switches 3 that apply powers of the respective phases (an R phase, an S phase, and a T phase) to the induction motor 2 are defined as U, V, X, and Y as in FIG. 2.

Figure 3:
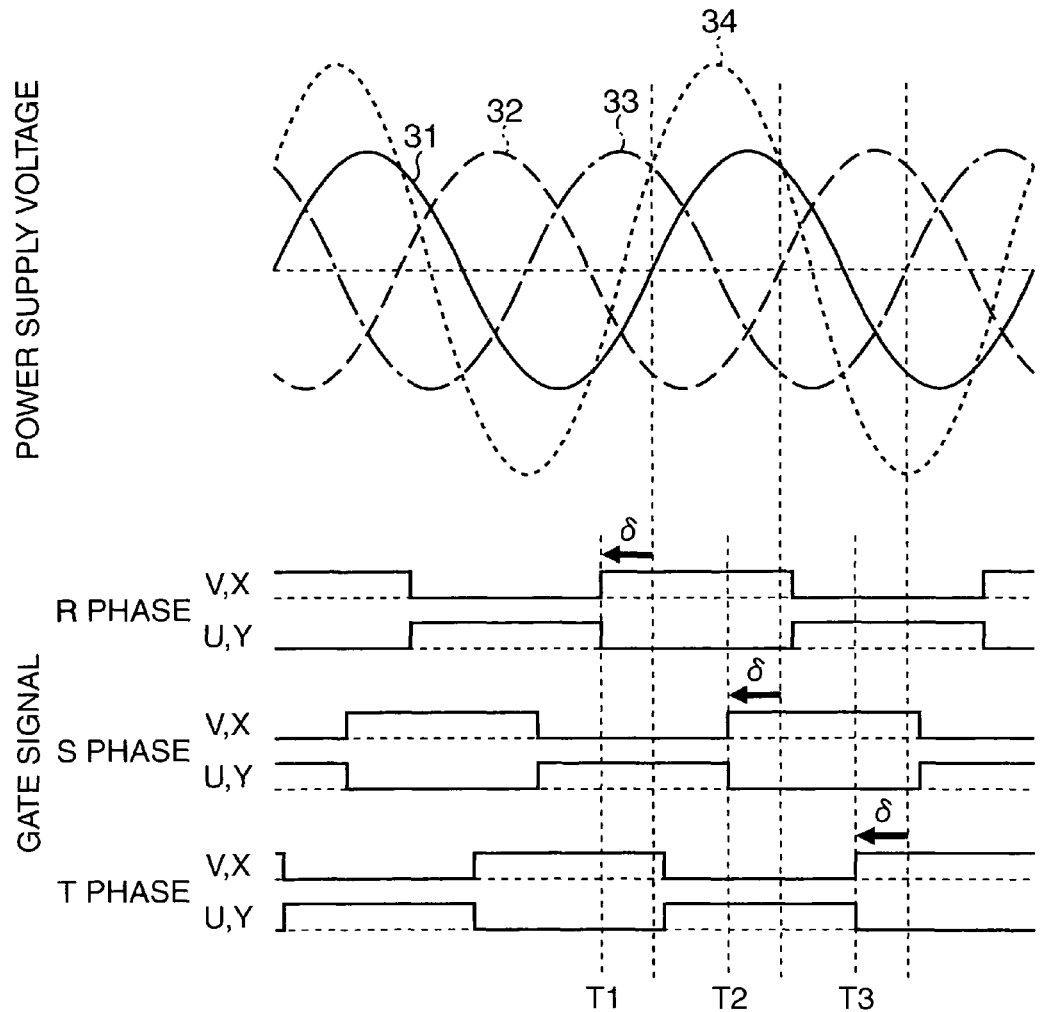
FIG. 3 is a schematic view showing a control method of respective self distinguishing elements of the magnetic energy recovery switches.

FIG. 3 is a schematic view for explaining a control method (flow) of the respective self distinguishing elements U, V, X, and Y in the magnetic energy recovery switches. Concretely, FIG. 3 is a graph showing the time waveforms of the power supply voltages of the AC power supply 1 and time changes of on • off (High • Low) of gate signals of the respective self distinguishing elements (V, X or U, Y).

In the magnetic energy recovery switches 3 in the respective phases, paired V and X, and paired U and Y are simultaneously turned on or off respectively. Each of the magnetic energy recovery switches in the respective phases performs on and off one time in one cycle of the AC power supply 1. As shown in FIG. 3, the respective self distinguishing elements U, V, X, and Y in the magnetic energy recovery switches 3 in the respective phases are controlled in synchronization with phase voltages (R-phase voltage 31, S-phase voltage 32, and T-phase voltage 33) of "the phases of the AC power supply 1" corresponding to the magnetic energy recovery switches 3. V and X are turned on and U and Y are turned off at times after only periods of phase lead times δ (the switching phases) lead (for example, times T1, T2, and T3) on the basis of times when the respective phase voltages 31 to 33 turn positive from negative. Similarly, U and Y are turned on and V and X are turned off at the times after only the periods of the phase lead times δ lead on the basis of times when the respective phase voltages 31 to 33 turn negative from positive. Incidentally, in FIG. 3, a line voltage 34 indicates a line voltage between the R phase and the S phase.

Figure 4:
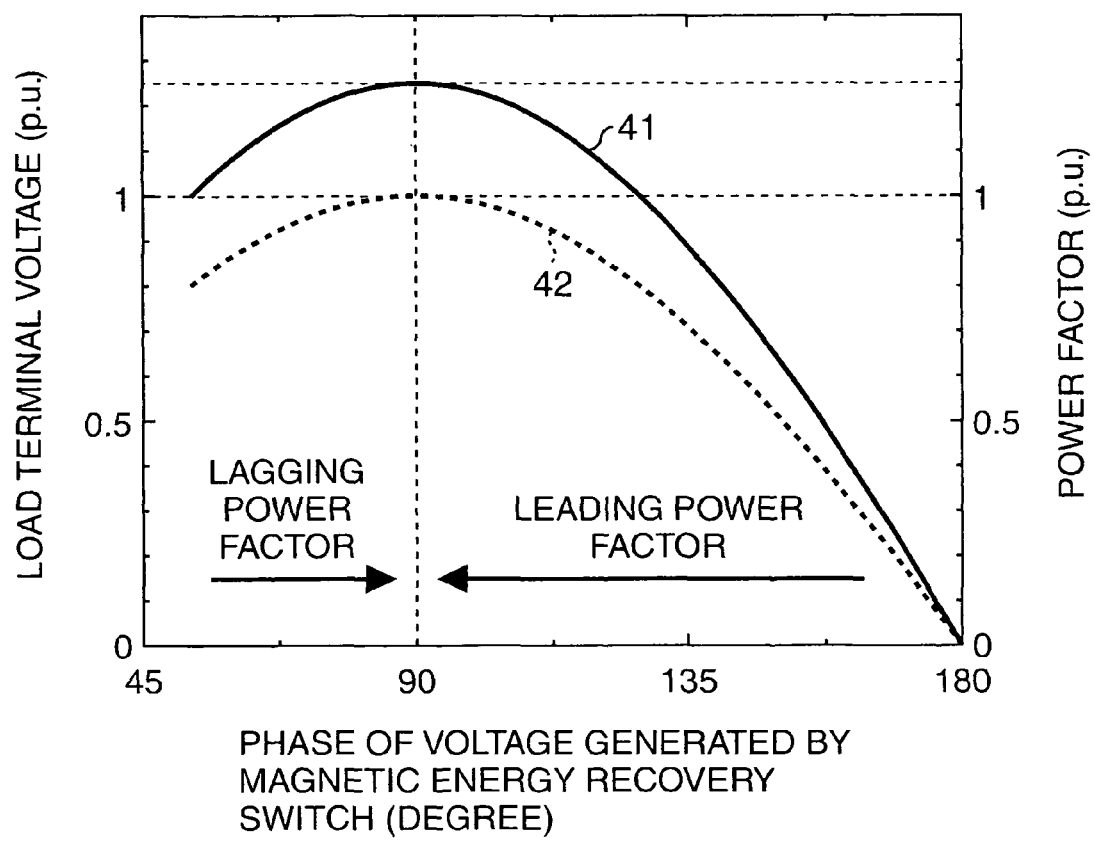
FIG. 4 is a view showing one example of a relationship between a phase of a voltage generated by the magnetic energy recovery switch, a load terminal voltage, and a power factor.

FIG. 4 is a graph showing a relationship between a phase of a voltage generated by the magnetic energy recovery switch 3, a load terminal voltage, and a power factor. Here, "the load terminal voltage" is a voltage on an output terminal (load side terminal) side of each of the magnetic energy recovery switches 3. Further, "the power factor" is a power factor on the voltage of the AC power supply 1 and the current to flow from the AC power supply 1. The graph shown in FIG. 4 shows a theoretical load terminal voltage (graph 41) and a power factor (graph 42) in the case when an alternating voltage whose phase is controlled in the magnetic energy recovery switch 3 is applied to an ideal load, which has a lagging power factor of 0.8, made of a resistance and a coil. Here, "the phase of the voltage generated by the magnetic energy recovery switch 3" is a difference in phase between the voltage of the AC power supply 1 and the alternating voltage generated by the magnetic energy recovery switch 3. It is assumed here that the phase is positive when the voltage generated by the magnetic energy recovery switch 3 is leading. As shown in FIG. 4, controlling the timings of switching of the respective self distinguishing elements U, V, X, and Y, namely the phase lead times δ, makes it possible to control the phase of the voltage generated by the magnetic energy recovery switch 3.

According to FIG. 4, the power factor is one when the phase of the voltage generated by the magnetic energy recovery switch 3 is 90 degrees. Then, as an operation area for controlling the load terminal voltage, two operation areas exist. One of them is the area of the lagging power factor, and the other of them is the area of the leading power factor.

As above, it is found that by changing the timings of switching of the respective self distinguishing elements U, V, X, and Y, namely the phase lead times δ, the power factor can be controlled, and thereby the load terminal voltage can be controlled.

The magnetic energy recovery switches 3 behave as series capacitors depending on the characteristic of the induction motor 2, and thereby the series capacitors and an inductance of the induction motor 2 configure an LC circuit. Then, the terminal voltages and the currents of the induction motor 2 oscillate by a self excitation phenomena of the induction motor 2, and thereby there is sometimes a case that the operation of the induction motor 2 becomes unstable. Thus, in this embodiment, the voltage detection device 9 connected between the magnetic energy recovery switches 3 and the induction motor 2 measures the voltages to be applied to the induction motor 2 to feed measured values back to the gate control device 6. Then, it is designed such that switching phase amounts (the phase lead times δ) are feedback-controlled in the gate control device 6 to thereby avoid the above instability phenomena.

(1-3. Detailed Configuration)

Figure 5:
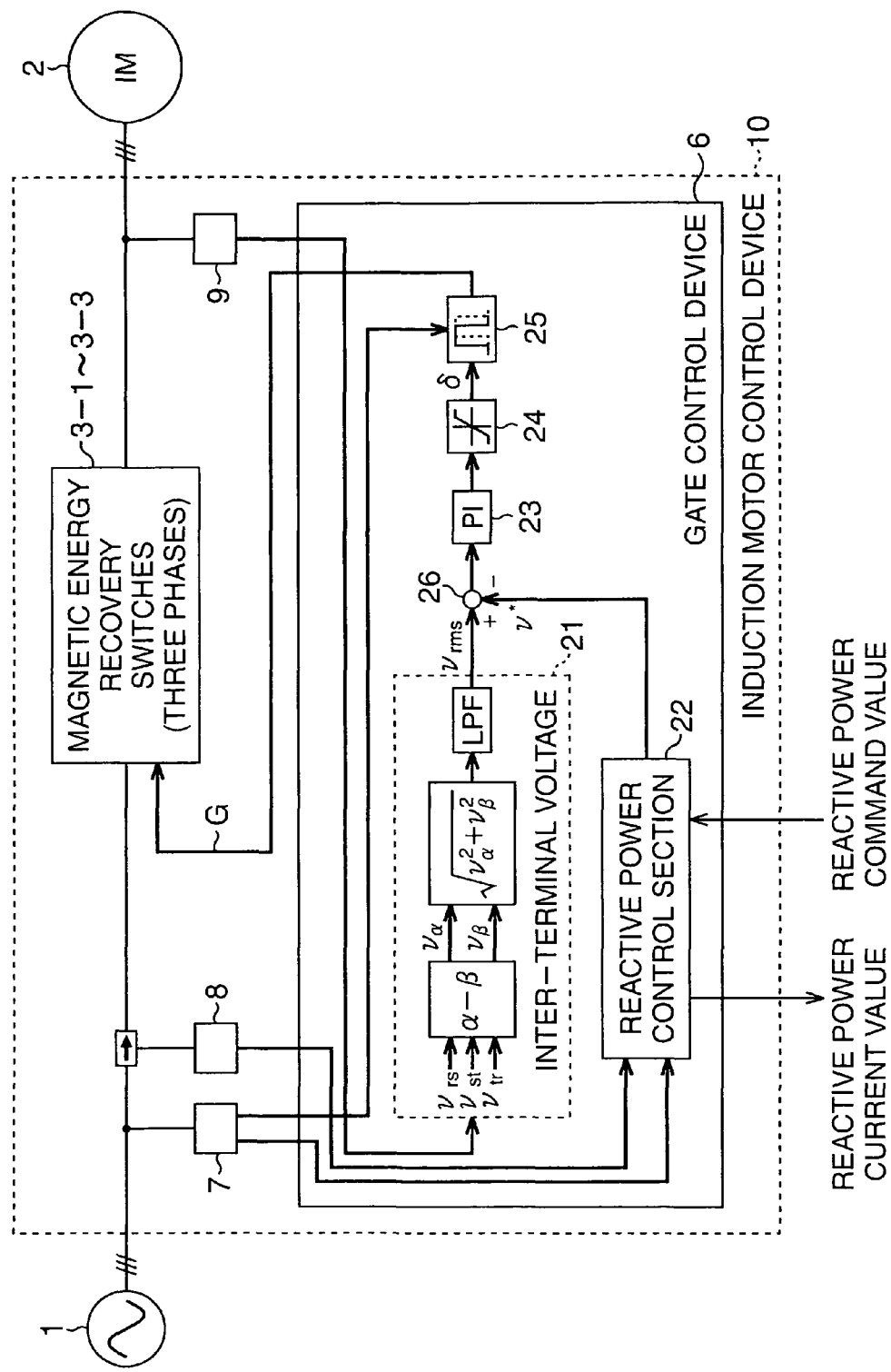
FIG. 5 is a view showing one example of a control block of the inside of a gate control device used for controlling reactive power in the induction motor control device according to the first embodiment.

FIG. 5 is a view more particularly showing one example of the gate control device 6 in the induction motor control device 10 shown in FIG. 1. That is, FIG. 5 is a view including one example of a configuration of a control block of the inside of the gate control device 6 used to control the terminal voltages of the induction motor 2. An inter-terminal voltage arithmetic operation section 21 in the gate control device 6 first obtains line voltage values (Vrs, Vst, and Vtr) from instantaneous values of the terminal voltages of the respective three phases of the induction motor 2 that are continuously or successively measured in the voltage detection device 9. Then, the inter-terminal voltage arithmetic operation section 21 three-phase to two-phase transforms the line voltage values (Vrs, Vst, and Vtr) to obtain two-phase instantaneous voltage values (Vα, Vβ). Next, the inter-terminal voltage arithmetic operation section 21 calculates the square root of the sum of the squares of the two-phase instantaneous voltage values (Vα, Vβ) to obtain an instantaneous voltage effective value. The above instantaneous voltage effective value includes "a signal originated from a harmonic component being a frequency component higher than the power supply frequency" included in the terminal voltages of the induction motor 2. Thus, the inter-terminal voltage arithmetic operation section 21 preferably removes the above signal by a low-pass filter (LPF) to thereby calculate a terminal voltage measured value Vrms. However, the low-pass filter (LPF) is not necessarily employed On the other hand, power supply voltage waveforms of the three-phase AC power supply 1 measured in the voltage detection device 7 are input to a reactive power control section 22 in the gate control device 6. Further, power supply current waveforms of the three-phase AC power supply 1 measured in the current detection device 8 are also input to the reactive power control section 22. The reactive power control section 22 obtains a current value of reactive power supplied from the power supply, (which will be hereinafter abbreviated as reactive power according to need), based on the power supply voltage waveforms and the power supply current waveforms. Then, the reactive power control section subtracts the current value of the reactive power from a command value of reactive power set previously to convert a subtracted value to a voltage value. Then, the reactive power control section 22 outputs the above voltage value as a command value V* for the terminal voltages of the induction motor 2, (which will be referred to as a terminal voltage command value, hereinafter).

Incidentally, as is this embodiment, only line voltages of three-phase power supply wirings are observable in many cases. At this time, it is necessary that as shown in FIG. 3, a phase voltage lagging behind a line voltage (the line voltage 34 between R and S, for example) by a time corresponding to 30 degrees is assumed to control gates of the self distinguishing elements U, V, X, and Y. Thus, for example, the reactive power control section 22 regards cycles of three-phase AC power supply voltages as fixed and detects a zero point of the voltage of each of the phases to measure a period of time from the above zero point with a timer, thereby being able to obtain the phase voltage lagging behind the line voltage by the time corresponding to 30 degrees. Further, an instantaneous voltage of the three-phase AC power supply voltages is continuously detected in the voltage detection device 7 to generate a signal in synchronization with a waveform of the instantaneous voltage by a PLL (phase • locked • loop). Then, also by a method of shifting the phase of the signal by the time corresponding to 30 degrees by a phase shifter, the phase voltage lagging behind the line voltage by the time corresponding to 30 degrees can be obtained more effectively. In this manner, based on the power supply voltage waveforms and power supply current waveforms of the three-phase AC power supply 1, the reactive power control section 22 arithmetically operates the terminal voltage command value V* being a reference signal for driving the induction motor 2 to output it.

The gate control device 6 performs an arithmetic operation for making the terminal voltage measured value Vrms (instantaneous voltage effective value) arithmetically operated by the measured values of the line voltages in the above-described inter-terminal voltage arithmetic operation section 21 correspond to the terminal voltage command value V* output from the reactive power control section 22. For this reason, first, a subtracter 26 calculates a deviation value between the terminal voltage measured value Vrms and the terminal voltage command value V*. Then, a PI control section 23 performs a proportional-integral control based on the deviation value to thereby feedback-control the phase lead times δ. In this embodiment, the terminal voltage to be applied to the induction motor 2 is controlled by the above feedback-control. Further, by the above feedback-control, it is possible to control the terminal voltage of the induction motor 2 to be the terminal voltage command value V* given by the reactive power control section 22 even when a circuit constant of the induction motor 2 changes according to a load state of the induction motor 2. Further, by appropriately selecting a feedback gain by the above feedback-control, the instability phenomena by the self excitation phenomena of the induction motor 2 as described previously can be avoided.

Incidentally, the gate control device 6 shown in FIG. 5 is provided with a voltage limiter 24 as a measure when an output signal from the above-described PI control section 23 is excessive. That is, when the signal indicating the phase lead time δ output from the PI control section 23 is excessive, the voltage limiter 24 limits the signal to a predetermined value. If the voltage limiter 24 is provided in this manner, it is possible to prevent the excessive signal from the PI control section 23 from being output from the gate control device 6, so that it is preferable. However, the voltage limiter 24 is not necessarily provided.

A phase controller 25 generates signals indicating the phase lead times δ on the basis of predetermined timings of the power supply voltages (the zero points, here) based on the phases of the power supply voltages of the three-phase AC power supply 1 measured in the voltage detection device 7 as gate signals G to the magnetic energy recovery switches 3. Then, the phase controller 25 outputs the generated gate signals G to the magnetic energy recovery switches 3.

FIG. 5 shows the case where the PI control section 23 is provided as one example of a control section in order to feedback-control the phase lead times δ by a proportional-integral control method. However, it goes without saying that a P control section can be used in place of the above PI control section 23 in the case when the phase lead times δ are feedback-controlled by a proportional control method. Further, in the case when the phase lead times δ are feedback-controlled by a proportional-integral-derivative control method, it is possible to use a PID control section in place of the above PI control section 23. However, the speed of the feedback-control does not increase very much even though a derivative action is performed, and there is a risk that the derivative action results in an instability factor in the feedback-control, so that it is desirable to employ the proportional control method or the proportional-integral control method.

As above, the gate control device 6, as has been explained by using FIG. 3, generates the gate signals G that are in synchronization with the power supply voltages and with the phases leading by the phase lead times δ to supply them to the magnetic energy recovery switches 3 (3-1 to 3-2). Thereby, as shown in FIG. 3, the gates of the self distinguishing elements U • Y and V • X are turned on • off (V • X are turned off when U • Y are turned on, and U • Y are turned off when V • X are turned on) at the times after only the phase lead times δ lead from the zero points of the power supply voltages.

<2. Control Example and the Like of the Induction Motor by the Induction Motor Control Device According to the First Embodiment>

Figure 6:
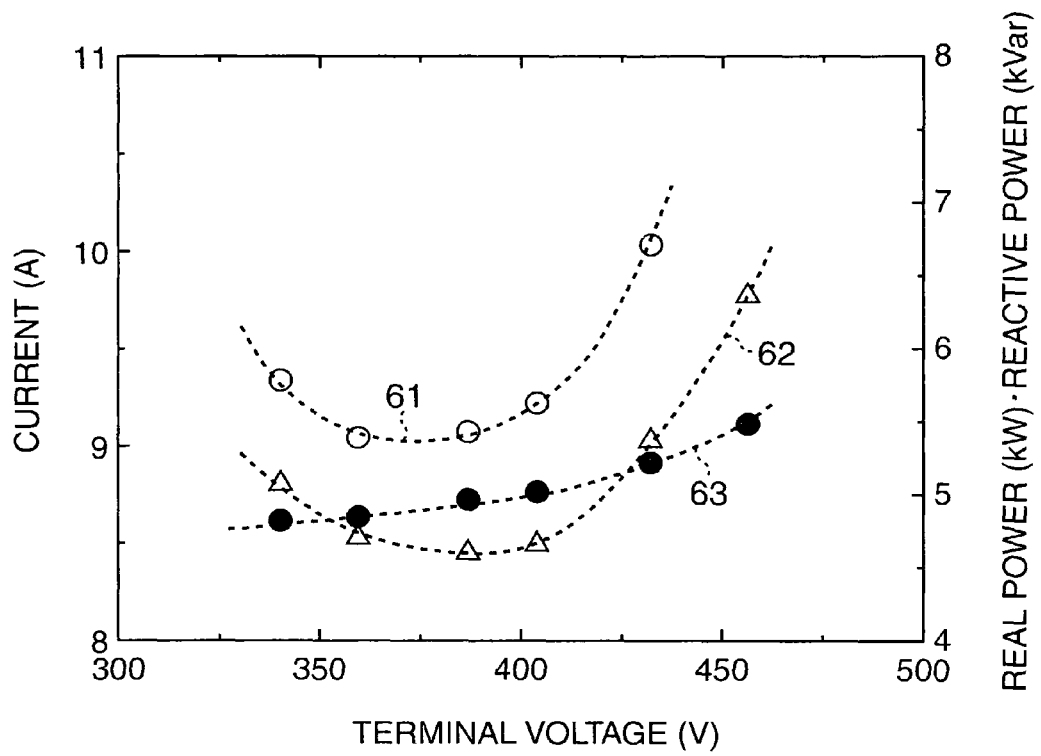
FIG. 6 is a view showing changes of a current flowing into a terminal of an induction motor, real power consumption, and generated reactive power in the case when a terminal voltage of the induction motor is controlled by the induction motor control device according to the first embodiment.

FIG. 6 is a view showing one example of a relationship between the terminal voltage of the induction motor 2 and current that flows from the terminal of the induction motor 2 (a graph 61) • real power consumption (a graph 63) • generated reactive power (a graph 62). FIG. 6 shows a measurement result obtained when the switching phase (phase lead time δ) of the gates of the self distinguishing elements U • Y, V • X is controlled by the induction motor control device 10 according to this embodiment to control the terminal voltage of the induction motor 2 with the rated specification of 400 V and 5.5 kW. Incidentally, the power factor of the load in this time is 0.7 (the lag). Further, the terminal voltage of the induction motor 2 is controlled in the operation area where the power factor of the magnetic energy recovery switch 3 leads. As shown in FIG. 4, controlling the phase lead time δ allows the terminal voltage of the induction motor 2 to be controlled. Then, as shown in FIG. 6, the induction motor control device 10 generates reactive power to the AC power supply 1. Then, controlling the terminal voltage of the induction motor 2 allows a generation amount of the reactive power to be controlled. Thus, it is found that controlling the phase lead time δ allows the generation amount of the reactive power to be controlled.

Based on the experimental results (FIG. 4, FIG. 6) as above, the gate control device 6 arithmetically operates a current value of the reactive power from current measured values of the AC power supply 1 side and voltage measured values of the AC power supply 1 side that are measured in the current detection device 8 and the voltage detection device 7 respectively. Then, the gate control device 6 controls the terminal voltages (phase lead times δ) of the induction motor 2 such that the arithmetically operated current value of the reactive power becomes a desired value, thereby being able to control the generation amount of the reactive power.

That is, as described previously, the gate control device 6 is configured as in FIG. 5 in this embodiment. Then, the measured values of the current detection device 8 and the voltage detection device 7 are input to the reactive power control section 22, and the reactive power control section 22 arithmetically operates a measured value (namely, the current value) of the reactive power generated by the induction motor control device 10 to the AC power supply 1. Then, the reactive power control section 22 controls the terminal voltage command value V* such that the current value of the reactive power agrees with a command value of reactive power input externally. It is assumed that in FIG. 4, for example, the phase of the gate signal G is gradually changed to 180 degrees from about 130 degrees to operate the induction motor control device 10 in the leading power factor area. In the above case, as shown in FIG. 6, the generated reactive power becomes the lowest limit when the terminal voltage of the induction motor 2 is a certain value, and has a characteristic that it increases even though the terminal voltage is increased or reduced from the value (see the graph 62).

Incidentally, an input/output section (not illustrated) outputting the measured value of the reactive power and receiving the command value of the reactive power may also be provided in the reactive power control section 22.

Figure 7:
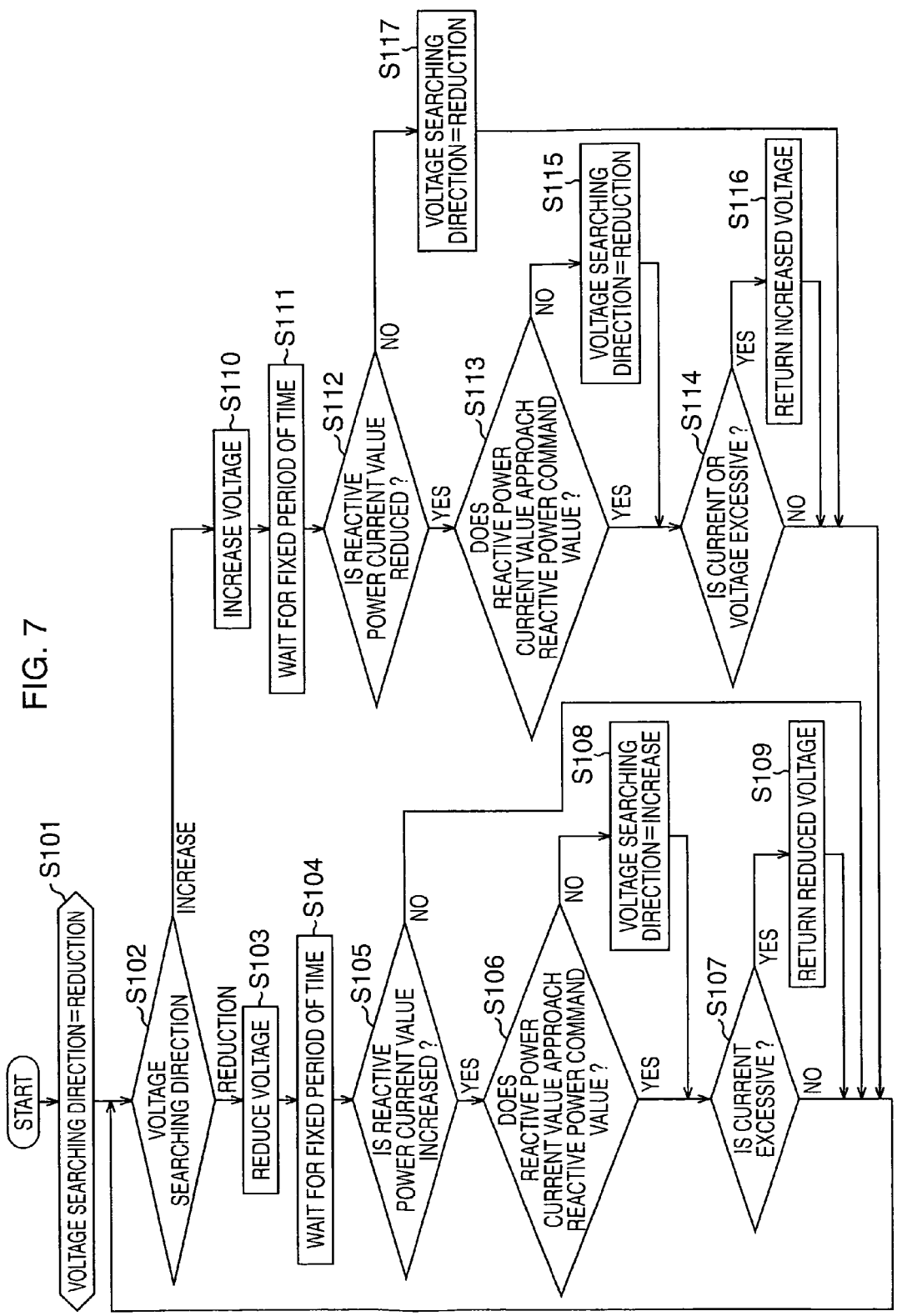
FIG. 7 is a flowchart showing one example of a control flow achieving control of reactive power generated by the induction motor control device according to the first embodiment.

FIG. 7 is a flowchart showing one example of a control flow of the reactive power control section 22 controlled such that the measured value of the reactive power approaches the command value of the reactive power in the leading power factor range. Incidentally, the explanation is conducted here on the assumption that the relationship between the terminal voltage of the induction motor 2 and the reactive power is the relationship shown in FIG. 6 (the relationship where the reactive power becomes the lowest limit when the terminal voltage of the induction motor 2 is a certain value, and the reactive power increases even though the terminal voltage is increased or reduced from the value).

In the above control flow, the reactive power control section 22 first sets a reducing direction as a search direction of the terminal voltage of the induction motor 2 (voltage search direction) (step S101). The reactive power control section 22 measures the change of the generation of the reactive power by increasing or reducing the current terminal voltage of the induction motor 2 according to the voltage search direction (steps S102, S103 to S105, or steps S102, S110 to S112). When the current value (measured value) of the reactive power is smaller than the command value set previously, the reactive power control section 22 reduces the terminal voltage of the induction motor 2 (step S108 after step S106 is processed, steps S102, S103 to S109 that are not processed, or steps S102, S103 to S109 after step S115 is processed).

On the other hand, when the current value (measured value) of the reactive power is larger than the command value, the reactive power control section increases the terminal voltage of the induction motor 2 (steps S102, S110 to S116 after step S108 is processed, or step S115 after step S113 is processed, steps S102, S110 to S116 that are not processed). At this time, although the current increases by the reduction of the terminal voltage of the induction motor 2, the reactive power control section 22 can increase the reactive power in the range where the current does not become excessive (steps S107, S109, and steps S114, S116).

This embodiment is designed such that the command value of the reactive power is set in advance in the reactive power control section 22. However, it may also be designed such that the command value of the reactive power is not set in advance in the reactive power control section 22, but the reactive power control section 22 changes the phases of the gate signals G to thereby search the minimum value. Further, the reactive power control section 22 can reduce the reactive power until the terminal voltages become the terminal voltage at which the reactive power becomes the minimum or the terminal voltages reach the upper limit voltage allowable to the terminal voltages.

Further, the control range of the reactive power is determined according to the constant, the load state, or the like of the induction motor 2. Thus, in the case when the command value of the reactive power falls out of the control range, the current value of the reactive power becomes the upper limit or lower limit value of the control range, and thereby it does not agree with the command value.

Further, in FIG. 7, it is designed such that in step S101, the reactive power control section 22 first sets the search direction of the terminal voltage of the induction motor 2 to the reduction to then perform the processing of step S102 and thereafter. However, it is of course possible that in step S101, the reactive power control section 22 first sets the search direction of the terminal voltage of the induction motor 2 to the increase to then perform the processing of step S102 and thereafter.

Further, the induction motor control device in this embodiment can be applied even to a single-phase induction motor. In such a case, only the single magnetic energy recovery switch is needed. Further, the inter-terminal voltage arithmetic operation section 21 omits the three-phase to two-phase transformation to obtain an effective value of a single-phase voltage from a measured value by the voltage detection device 8.

Incidentally, in this embodiment, for example, the voltage detection device 9 is employed, and thereby one example of a first voltage detection unit is fabricated. Further, for example, the voltage detection device 7 is employed, and thereby one example of a second voltage detection unit is fabricated, and the current detection device 8 is employed, and thereby one example of a current detection unit is fabricated. Further, for example, the gate control device 6 is employed, and thereby one example of a gate control unit is fabricated. Further, for example, the PI control section 23 is employed, and thereby one example of a control section is fabricated, and the phase controller 25 is employed, and thereby one example of a phase control section is fabricated.

<3. Induction Motor Group Control System According to a Second Embodiment>

Figure 8:
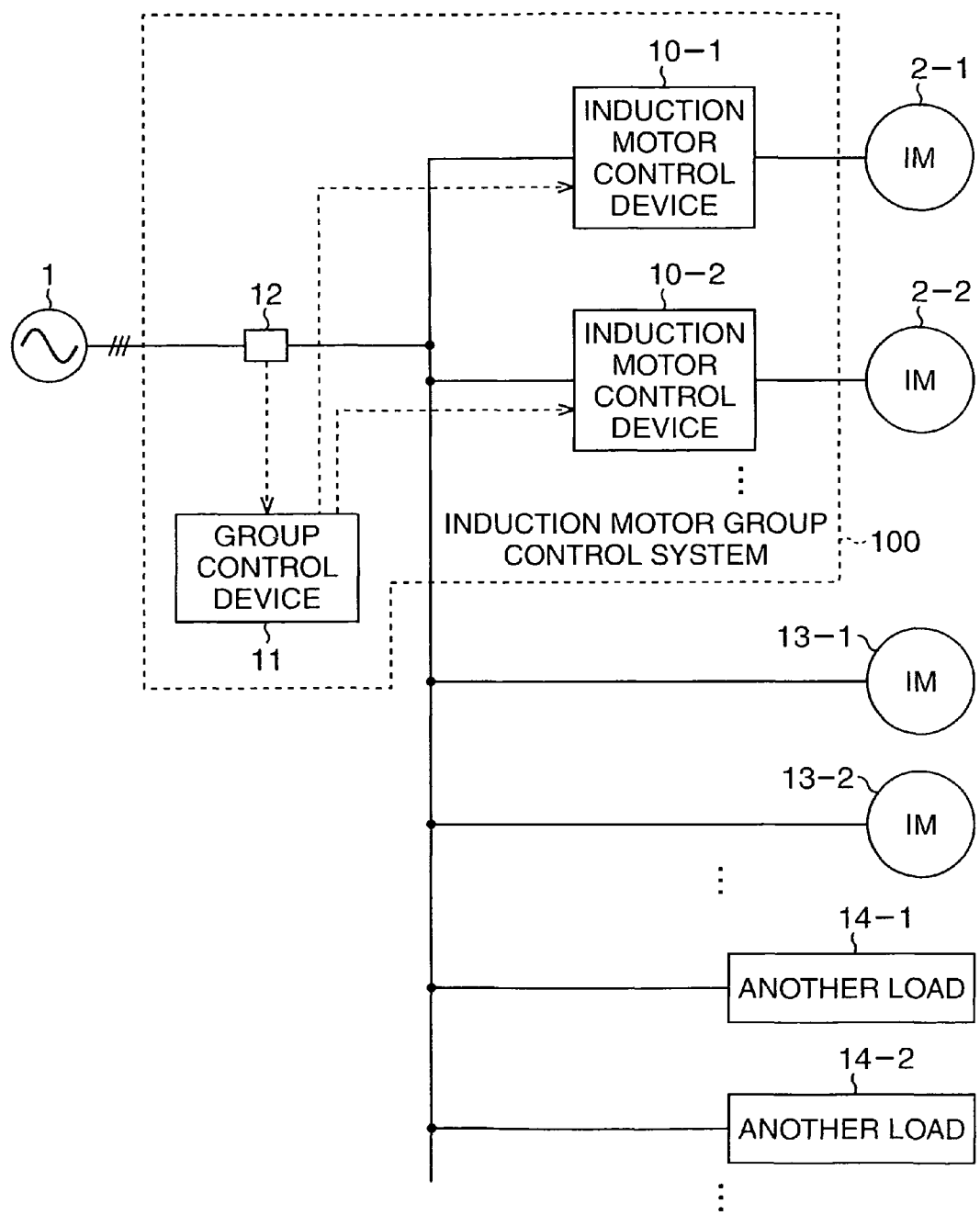
FIG. 8 is a block diagram showing a configuration example of an induction motor group control device according to a second embodiment of the present invention.

FIG. 8 is a view showing a configuration example of an induction motor group control system according to a second embodiment of the present invention. The induction motor group control system employs the induction motor control device 10 according to the first embodiment. An induction motor group control system 100 is configured to include: the plurality of induction motor control devices 10 (10-1, 10-2, . . . ); a group control device 11; and a power factor • voltage measuring device 12.

The plurality of induction motor control devices 10 (10-1, 10-2, . . . ) are connected to an AC power supply 1, and are disposed one by one to correspond to a plurality of induction motors 2 (2-1, 2-2, . . . ), and individually control the plurality of induction motors 2 (2-1, 2-2, . . . ) respectively.

The group control device 11 gives a command of a generation amount of reactive power to the respective induction motor control devices 10 (10-1, 10-2, . . . ).

The power factor • voltage measuring device 12 measures a power factor and voltage of the AC power supply 1 in a basic wiring to which branch wirings to the plurality of induction motors 2 are connected.

At least either one or a plurality of induction motors 13-1, 13-2, . . . that do not each employ the induction motor control device 10, or one or a plurality of loads 14-1, 14-2, . . . other than induction motors may also be connected to the AC power supply 1. However, the induction motors 13-1, 13-2, . . . or the loads 14-1, 14-2, . . . need not also be connected to the AC power supply 1. Incidentally, a lighting device, an electromagnetic valve, and the like are cited as the loads 14-1, 14-2, . . . .

Generally, the induction motor 2 is a load with a lagging power factor. On the other hand, in the case when the induction motor 2 is driven by the induction motor control device 10 according to the first embodiment, the induction motor 2, when seen from the AC power supply 1 side, has a possibility to be a load with a leading power factor. However, even in the case when the induction motor control device 10 in the first embodiment is employed, it is also possible to control the induction motor 2 in a lagging power factor range depending on the control.

In the configuration example in FIG. 8, the power factor • voltage measuring device 12 measures a power factor of current taken from the AC power supply 1 and measures a current value of reactive power. Then, the group control device 11 gives each of the induction motor control devices 10-1, 10-2, . . . a command of reactive power that has to be generated based on the current value of the reactive power measured in the power factor • voltage measuring device 12 (outputs a command value of reactive power). This makes it possible to control the induction motors 2-1, 2-2, . . . such that the power factor of the entire current supplied from the AC power supply 1 is maximized. At this time, there is also a possibility that some of the induction motor control devices 10 control the induction motors 2 such that the induction motors 2 each have the lagging power factor depending on the number of the induction motors 2 employing the induction motor control devices 10, the number of the induction motors 13 not employing the induction motor control devices 10, and the condition of the loads 14 other than induction motors.

As one example, a gate control device 6 in each of the induction motor control devices 10-1, 10-2, . . . is configured as in FIG. 5. Then, it is designed so as to enable control of reactive power generated by each of the induction motor control devices 10-1, 10-2, . . . by a control method shown in FIG. 7. Then, the power factor • voltage measuring device 12 measures the power factor of the current taken from the AC power supply 1 and measures the current value of the reactive power. Further, the group control device 11 controls reactive power generated by each of the induction motor control devices 10-1, 10-2, . . . .

(3-1. First Control Method)

Figure 9:
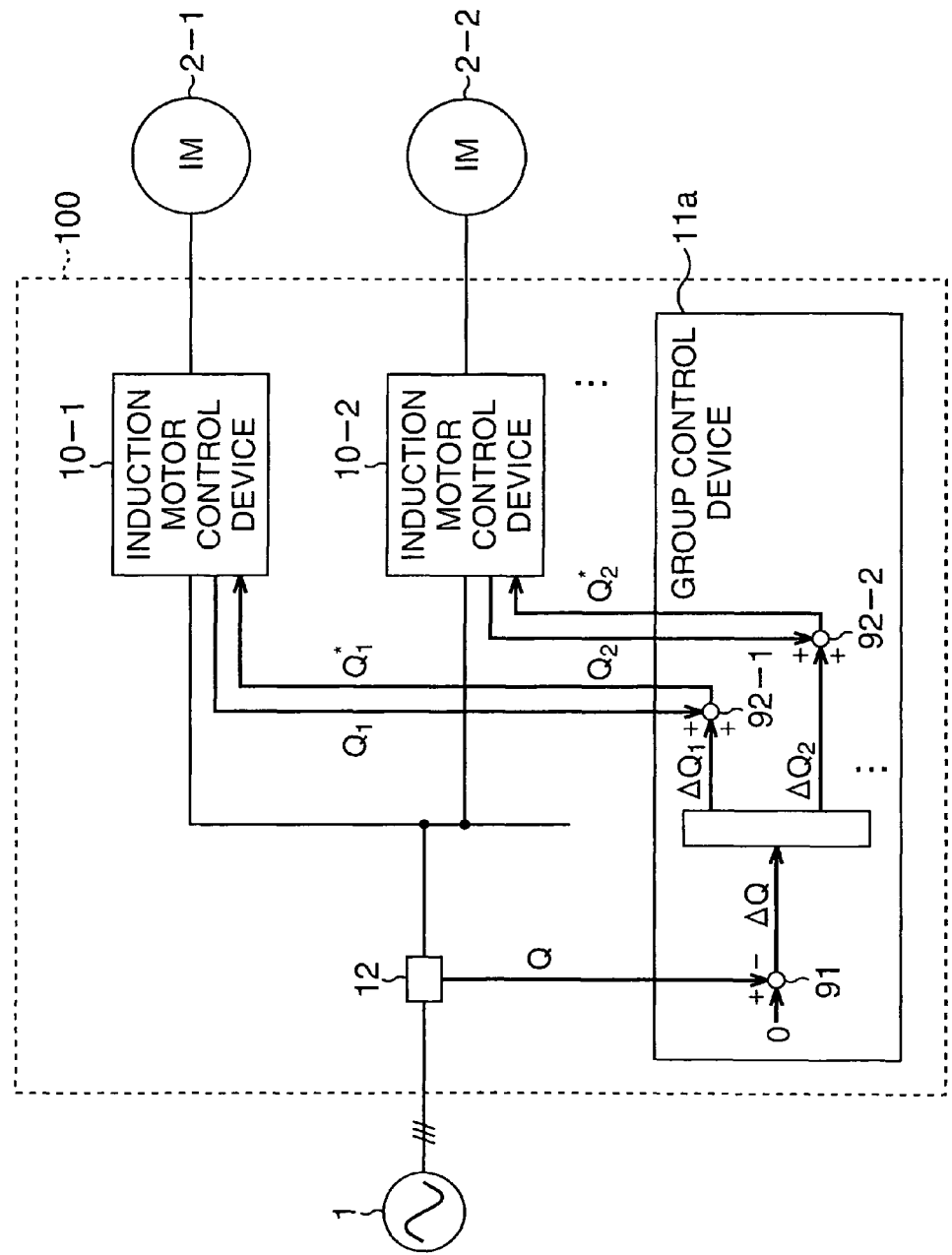
FIG. 9 is a view showing one example of a control block for controlling the sum of reactive powers generated by a plurality of induction motor control devices in the second embodiment.

FIG. 9 is a view particularly showing one example of a configuration of a group control device 11a according to a first example of this embodiment.

The group control device 11a generates command values of reactive power as shown in FIG. 9, thereby being able to control the sum of reactive powers generated by the plurality of induction motor control devices 10-1, 10-2, . . . .

A control method shown in FIG. 9 performs control such that a current value Q of the entire reactive power obtained from the power factor • voltage measuring device 12, (in which reactive power in the case of a lagging power factor is set to be negative, here), is made to approach zero. The group control device 11a obtains necessary reactive power $\Delta Q$ (=0−Q) by a subtracter 91. Then, the group control device 11a proportionally distributes the obtained reactive power $\Delta Q$ to the induction motor control devices 10-1, 10-2, . . . according to each capacity of the induction motors 2-1, 2-2, . . . driven by the induction motor control devices 10-1, 10-2, . . . . In FIG. 9, reactive powers proportionally distributed to the induction motor control devices 10-1, 10-2, . . . are set to $\Delta Q_1$, $\Delta Q_2$, . . . respectively.

Then, adders 92-1, 92-2, . . . add the reactive powers $\Delta Q_1$, $\Delta Q_2$, . . . to current values $Q_1$, $Q_2$, . . . of reactive powers obtained from the respective induction motor control devices 10-1, 10-2, . . . . Thereby, reactive power command values $Q_1^*$, $Q_2^*$, . . . to be supplied to the respective induction motor control devices 10-1, 10-2, . . . are obtained. The group control device 11a supplies the reactive power command values $Q_1^*$, $Q_2^*$, . . . to the induction motor control devices 10-1, 10-2, . . . .

(3-2. Second Control Method)

Figure 10:
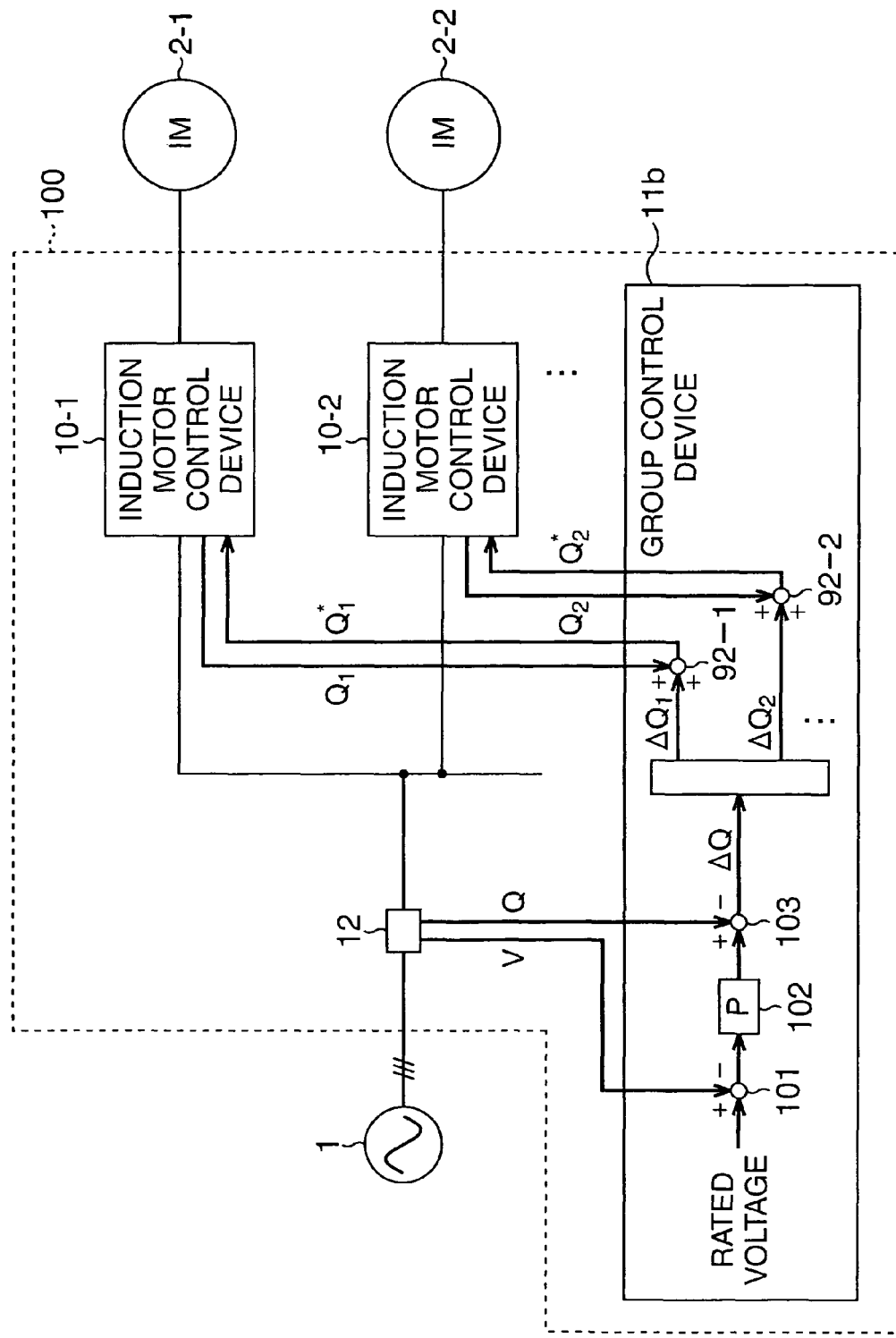
FIG. 10 is a view showing one example of a control block for controlling the sum of reactive powers generated by the plurality of induction motor control devices so as to compensate variations in power supply voltage in the second embodiment.

FIG. 10 is a view particularly showing one example of a configuration of a group control device 11b according to a second example of this embodiment.

The group control device 11b generates command values of reactive power as shown in FIG. 10, thereby being able to control voltage of the AC power supply 1 to be constant. In particular, at the time of start-up of the induction motors 2 directly connected to the AC power supply 1, large starting current flows into the induction motors 2. Thus, the voltage of the AC power supply 1 is reduced by a power supply impedance of the AC power supply 1. Thus, in a control method shown in FIG. 10, generation of reactive power is controlled so as to compensate the reduction in the voltage of the AC power supply 1 by the loads such as the induction motors directly connected to the AC power supply 1.

In the configuration example in FIG. 10, the power factor • voltage measuring device 12 measures voltage of the AC power supply 1 and a current value of reactive power. Then, based on the voltage of the AC power supply 1 and the current value of the reactive power that are measured in the power factor • voltage measuring device 12, the group control device 11b gives each of the induction motor control devices 10-1, 10-2, . . . a command of reactive power that has to be generated (outputs a command value of reactive power). This makes it possible to perform feedback-control so as to make the voltage of the AC power supply 1 constant.

As one example, the group control device 11b is configured as in FIG. 10. Then, a power supply voltage V of the AC power supply 1, together with the current value of the reactive power, is supplied to the group control device 11b from the power factor • voltage measuring device 12. A subtracter 101 in the group control device 11b subtracts the power supply voltage V of the AC power supply 1 from a rated voltage of the AC power supply 1. A P control section 102 proportionally controls the voltage obtained after the power supply voltage V of the AC power supply 1 is subtracted from the rated voltage of the AC power supply 1 to obtain a command value of reactive power. A subtracter 103 subtracts a current value Q of the entire reactive power obtained in the power factor • voltage measuring device 12, (in which reactive power in the case of a lagging power factor is set to be negative), from the command value of the reactive power to obtain necessary reactive power ΔQ. Then, the group control device 11b proportionally distributes the reactive power ΔQ to the induction motor control devices 10-1, 10-2, . . . according to each capacity of the induction motors 2-1, 2-2, . . . driven by the induction motor control devices 10-1, 10-2, . . . . In FIG. 10, the reactive powers proportionally distributed to the induction motor control devices 10-1, 10-2, . . . are set to ΔQ$_1$, ΔQ$_2$, . . . respectively.

Then, adders 92-1, 92-2, . . . add the reactive powers ΔQ$_1$, Q$_2$, . . . to current values Q$_1$, Q$_2$, . . . of reactive powers obtained from the respective induction motor control devices 10-1, 10-2, . . . . Thereby, reactive power command values Q$_1$*, Q$_2$*, . . . to be supplied to the respective induction motor control devices 10-1, 10-2, . . . are obtained. The group control device 11b supplies the reactive power command values Q$_1$*, Q$_2$*, . . . to the induction motor control devices 10-1, 10-2, . . . . In this manner, when the power supply voltage V of the AC power supply 1 is reduced, the reactive power Q is controlled to be increased, and thus even in the case when loads temporarily become high in operation as at the time of start-up of the induction motors 2, an effect of compensating the reduction in the power supply voltage V can be expected.

Incidentally, an input section for setting the above-described power factor or rated voltage, and an output section for displaying a control result may also be provided in the group control device 11. Further, in this embodiment, by employing the power factor • voltage measuring device 12, for example, one example of a measuring device and voltage measuring device is fabricated. However, in the second control method, it may also be designed so as to measure the voltage of the AC power supply 1 and the current value of the reactive power in different devices.

The preferred embodiments of the present invention have been described in detail above with reference to the drawings, but it goes without saying that the present invention is not limited to such examples. It is apparent that a person having common knowledge in the technical field to which the present invention belongs is able to devise various variation or modification examples within the range of technical ideas described in the claims, and it should be understood that such examples belong to the technical scope of the present invention as a matter of course.

Incidentally, in the above-described first and second embodiments, it is possible to configure the inter-terminal voltage arithmetic operation section 21, the reactive power control section 22, or the group control device 11 by employing, for example, a PLC (Programmable Logic Controller) or a sequencer. In the above case, a program for control is produced, and the PLC or the sequencer is executed by digital signal processing based on the above program, and thereby the function of the inter-terminal voltage arithmetic operation section 21, the reactive power control section 22, or the group control device 11 can be achieved. Further, the reactive power control section 22 or the group control device 11 may also be configured to employ a DSP (Digital Signal Processor). Besides the above, the reactive power control section 22 or the group control device 11 may also be configured to employ hardware (an arithmetic operation circuit).

Incidentally, in the present description, the steps described in the flowchart include not only the processings executed in time series along the described order but also the processings executed in parallel or individually, which are not necessarily processed in time series. Further, even as for the steps processed in time series, it goes without saying that the order can be changed appropriately depending on circumstances.

Industrial Applicability

According to the present invention, a large number of induction motors installed in a customer installation can be employed as reactive power compensation devices. Thus, it becomes possible to control a large number of the induction motors connected to the end of a distribution system to thereby achieve an improvement in a power factor and stabilization of power supply voltage in the vicinity of the end of the distribution system.

The invention claimed is:

1. An induction motor control device being an induction motor control device controlling an induction motor to operate based on power supplied from a three-phase AC power supply, the induction motor control device comprising:
  three magnetic energy recovery switches that are connected in series in respective phases between the AC power supply and the induction motor and each have four self distinguishing elements;
  a first voltage detection unit provided between said magnetic energy recovery switches and the induction motor and measuring a terminal voltage of each of the phases that is applied to the induction motor;
  a second voltage detection unit provided between the AC power supply and said magnetic energy recovery switches and measuring voltages of the AC power supply;
  a current detection unit measuring currents to be supplied to the induction motor; and
  a gate control unit generating a gate signal that controls on • off of each of the self distinguishing elements included in each of the magnetic energy recovery switches of the respective phases, wherein
  based on measured values of the terminal voltages input from said first voltage detection unit, measured values of the currents input from said current detection unit, and measured values of the voltages of the AC power supply input from said second voltage detection unit, said gate control unit sets a switching phase of the gate signal so as to control a generation amount of reactive power and controls voltages to be applied to the induction motor.

2. The induction motor control device according to claim 1, wherein
said gate control unit includes:
an inter-terminal voltage arithmetic operation section arithmetically operating a terminal voltage measured value being an instantaneous voltage effective value continuously based on the measured values of the terminal voltages input from said first voltage detection unit;
a reactive power control section calculating a measured value of the reactive power based on the measured values of the voltages of the AC power supply input from said second voltage detection unit and the measured values of the currents input from said current detection unit, and outputting a command value of the terminal voltages such that the measured value of the reactive power becomes a command value;
a control section performing P control or PI control based on a deviation between the terminal voltage measured value arithmetically operated in the inter-terminal voltage arithmetic operation section and the command value of the terminal voltages output from the reactive power control section, and generating a switching phase amount of the gate signal; and
a phase control section generating a gate signal shifted by the switching phase amount generated in the control section on the basis of the measured values of the voltages of the AC power supply input from said second voltage detection unit, and outputting the gate signal to each of said magnetic energy recovery switches of the respective phases.

3. An induction motor group control system being an induction motor group control system that uses a plurality of the induction motor control devices according to claim 1 or 2 to control a plurality of induction motors to operate based on power supplied from a three-phase AC power supply, the induction motor group control system comprising:
the plurality of induction motor control devices controlling the plurality of induction motors respectively;
a measuring device measuring reactive power based on a combined current of currents flowing into said plurality of induction motor control devices and other loads that are connected to the AC power supply; and
a group control device, based on the reactive power measured in said measuring device, generating a command value of reactive power to each of said plurality of induction motor control devices such that the reactive power becomes a predetermined value, and outputting the command value of the reactive power to each of said plurality of induction motor control devices to thereby control the amount of reactive powers generated by the plurality of induction motors, wherein
a power factor of the entire system composed of the plurality of loads including the plurality of induction motors driven by the AC power supply is controlled.

4. An induction motor group control system being an induction motor group control system that uses a plurality of the induction motor control devices according to claim 1 or 2 to control a plurality of induction motors to operate based on power supplied from a three-phase AC power supply, the induction motor group control system comprising:
the plurality of induction motor control devices controlling the plurality of induction motors respectively;
a measuring device measuring reactive power based on a combined current of currents flowing into said plurality of induction motor control devices and other loads that are connected to the AC power supply;
a voltage measuring device measuring voltages of the AC power supply; and
a group control device, based on the reactive power measured in said measuring device and the voltages measured in said voltage measuring device, generating a command value of reactive power to each of said plurality of induction motor control devices such that the reactive power becomes reactive power based on the voltages, and outputting the command value of the reactive power to each of said plurality of induction motor control devices to thereby control the amount of reactive powers generated by the plurality of induction motors and reduce variations in the voltages of the AC power supply.

* * * * *